Oct. 5, 1965  R. J. ROSA  3,210,642
MAGNETOHYDRODYNAMIC APPARATUS FOR PRODUCING
ALTERNATING CURRENT POWER
Filed Oct. 3, 1960  7 Sheets-Sheet 1

RICHARD J. ROSA
INVENTOR.

BY Alden D. Redfield
Melvin E. Frederick
ATTORNEYS

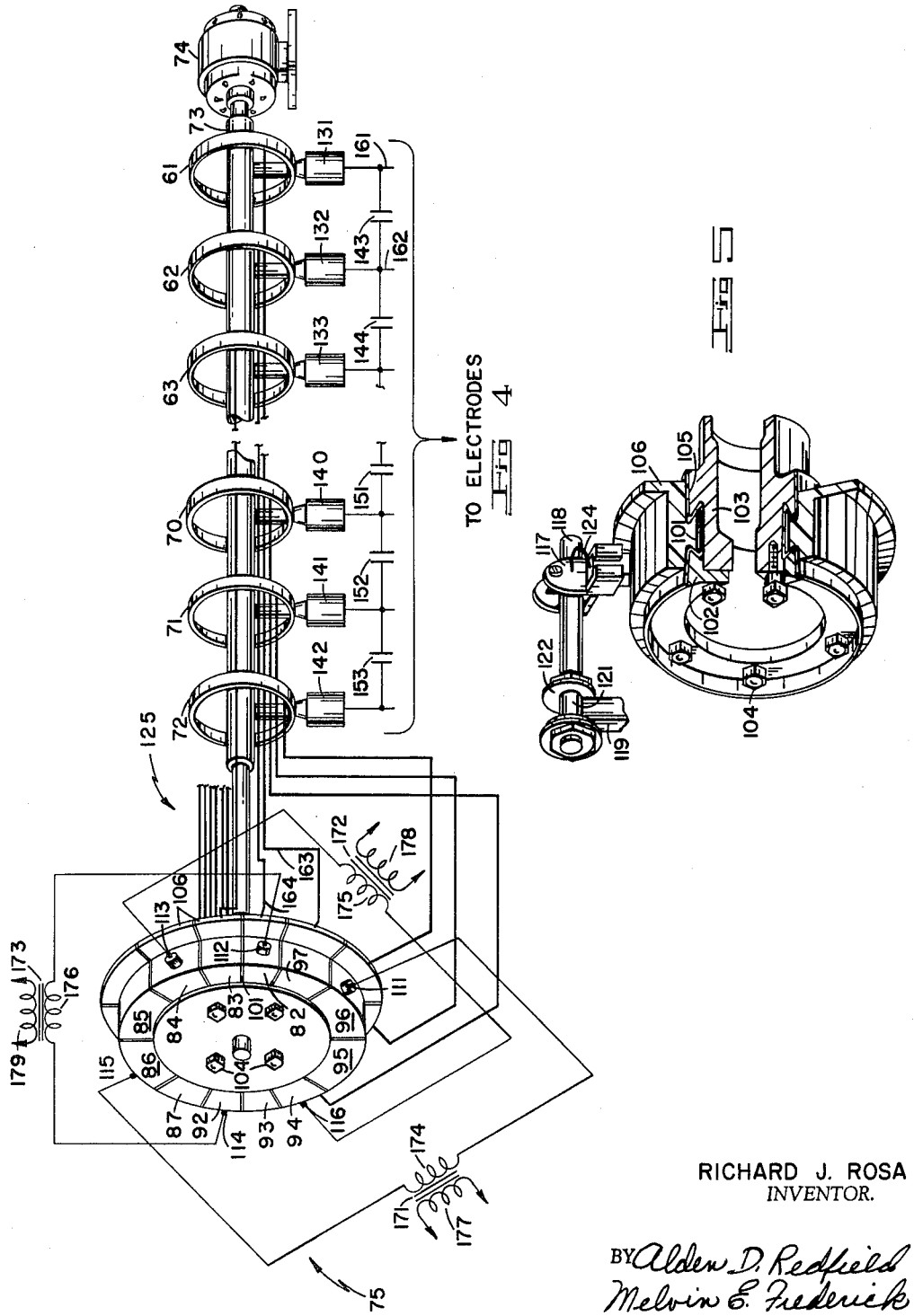

Oct. 5, 1965    R. J. ROSA    3,210,642
MAGNETOHYDRODYNAMIC APPARATUS FOR PRODUCING
ALTERNATING CURRENT POWER
Filed Oct. 3, 1960    7 Sheets-Sheet 3

RICHARD J. ROSA
INVENTOR.

BY Alden D. Redfield
Melvin E. Frederick
ATTORNEYS

Oct. 5, 1965 R. J. ROSA 3,210,642
MAGNETOHYDRODYNAMIC APPARATUS FOR PRODUCING
ALTERNATING CURRENT POWER
Filed Oct. 3, 1960 7 Sheets-Sheet 4

RICHARD J. ROSA
INVENTOR.

BY Alden D. Redfield
Melvin E. Frederick
ATTORNEYS

Oct. 5, 1965  R. J. ROSA  3,210,642
MAGNETOHYDRODYNAMIC APPARATUS FOR PRODUCING
ALTERNATING CURRENT POWER
Filed Oct. 3, 1960  7 Sheets-Sheet 5

RICHARD J. ROSA
INVENTOR.

BY Alden D. Redfield
Melvin E. Frederick
ATTORNEYS

RICHARD J. ROSA
INVENTOR.

BY Alden D. Redfield
Melvin E. Frederick
ATTORNEYS

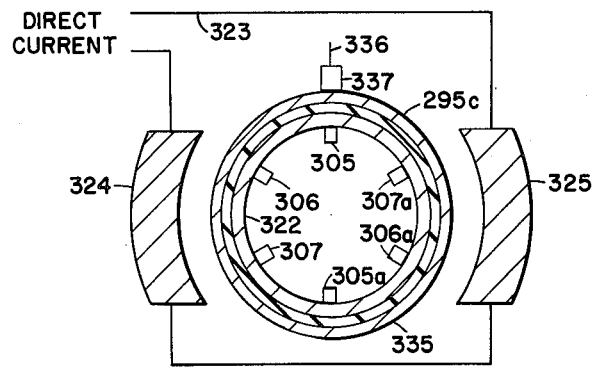
_Fig 16_
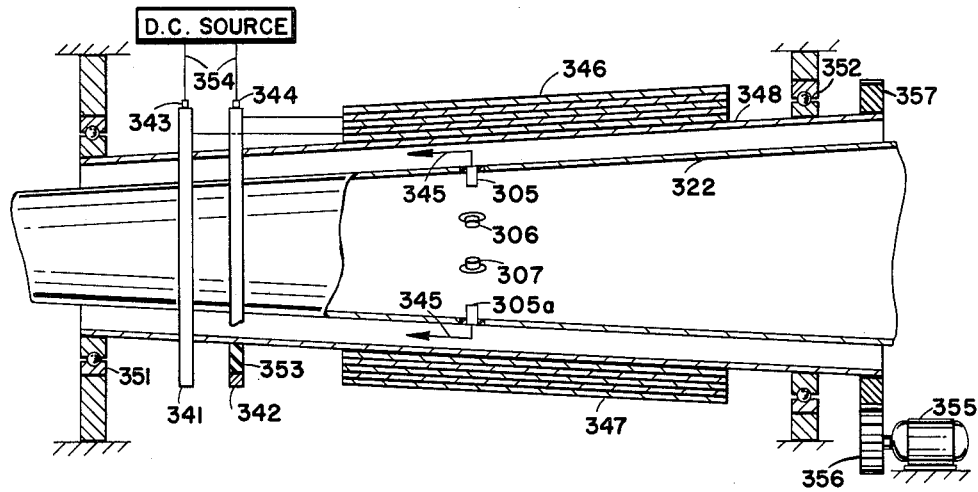
_Fig 17_
RICHARD J. ROSA
INVENTOR.

United States Patent Office

3,210,642
Patented Oct. 5, 1965

3,210,642
MAGNETOHYDRODYNAMIC APPARATUS
FOR PRODUCING ALTERNATING CURRENT POWER
Richard J. Rosa, Reading, Mass., assignor to Avco Corporation, Cincinnati, Ohio, a corporation of Delaware
Filed Oct. 3, 1960, Ser. No. 60,029
40 Claims. (Cl. 321—49)

The present invention relates to electric power generating equipment and particularly to a magnetohydrodynamic (hereinafter referred to as "MHD") generator and associated apparatus that is adapted to produce alternating current electric power. More specifically still, one embodiment of the invention relates to power generating apparatus employing an MHD generator and rotary distributor or commutator means for producing single phase or polyphase power and another embodiment of the invention relates to power generating apparatus employing an MHD generator wherein alternating current is produced by providing relative motion of a constant magnetic field with respect to electrodes in the MHD generator.

Very keen interest exists today in MHD generators. Such generators produce electric power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source. Conductivity of the gas may be produced thermally, or by seeding the gas with a substance that ionizes readily at the operating temperature of the generator. For seeding purposes, sodium, potassium, cesium, or an alkali metal vapor may be used. Regardless of the gas used, or the manner of seeding, the resulting gases comprise a mixture of electrons, positive ions, and neutral atoms which, for convenience, may be termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current. In commercial installations recently proposed, the inversion equipment takes the form of mercury arc rectifiers. Although this is feasible, such inverters have a relatively high first cost and significant energy losses that penalize the over-all efficiency of the system. Admittedly, in theory, alternating current can be produced by pulsing the gas stream as it passes through an MHD generator and/or by periodically reversing the direction of the magnetic field. In fact, however, such theoretical solutions are impractical and involve modulating an extremely high temperature gas stream at high frequency, or modulating a magnetic field storing large amounts of energy. As a result, attention has been directed toward special designs of MHD generators and towards simplified auxiliary equipment that can cooperate with the generators whereby alternating current may be obtained in a more economical and facile manner.

In its broadest aspect, the present invention is based upon and includes the principle that rotation of a constant magnetic field with respect to electrodes contained in an MHD generator or vice versa will provide a sinusoidal output current. As has been pointed out hereinabove and by way of comparison, periodically reversing the magnetic field by use of an alternating current to provide a varying magnetic field is unsatisfactory.

One embodiment of the present invention comprises an MHD generator having pairs of oppositely disposed electrodes with which current flow may be consecutively established by means of slip rings and a rotary distributor or commutator. In circuit with the rotary distributor is a transformer for supplying alternating current output power. An important aspect of the invention is the unique ability of the MHD generator having a constant magnetic field and a cylindrical or annular duct to provide a sine wave distribution of voltage and current around the periphery of the duct. Another important aspect of the invention is the provision of a current flow in the channel that is as uniform as possible in space and time and the provision of a sine wave output of voltage and current. A still further important aspect of the present invention is the provision of pairs of fixed electrodes radially located in the channel, each electrode of which is in electrical communication with a conducting segment carried by the rotary distributor. The provision of pair of brushes in fixed relation one with another past which the conductive segments are rotated, or which are rotated with respect to the conductive segments, permits coupling of the electric energy or electromotive force developed in the channel to a transformer and the interruption of small voltages and currents as electrical connection between a segment and a brush is broken. This is of vital importance in preventing electrical erosion of the switch contacts and serious energy losses that characterized earlier forms of mechanical inverters. By permitting the use of a plurality of brushes for a polyphase output, a brush switches a current less than the current $I_{DC}/n$ switched by a brush during commutation in a conventional direct current (D.C.) machine where $I_{DC}$ is the full direct current in the D.C. machine and $n$ is the number of poles.

A still further important aspect of the present invention is the inherent characteristic of the generator to provide a polyphase output wherein each electrode conducts a substantially constant current for a large fraction of the time.

Another embodiment of the present invention contemplates a physical rotation of the aforementioned constant magnetic field with respect to the electrodes in the MHD generator duct to provide a current or currents having a sine wave variation and connection of this current or currents to an output circuit.

An important aspect of this embodiment is the generation of a continuously varying sine wave of current and voltage at the electrodes which may be directly connected to an output circuit without the necessity of auxiliary equipment to convert essentially direct current to alternating current having a sine wave variation. Another important aspect of this embodiment is that a sine wave output is automatically, or naturally, produced and auxiliary equipment such as a rotary distributor and smoothing reactances are not required. The automatic or natural production of an alternating current output having a sine wave variation provides a waveform having the most desired configuration and is not subject to the losses, inefficiency and disadvantages inherent in the use of switching means.

In view of the foregoing, it is an object of the present invention to provide an improved MHD generator installation for producing alternating current.

Another object of the present invention is to provide in combination with an MHD generator a rotary distributor or commutator capable of establishing alternating current flow through portions of an electrical circuit associated with the rotary distributor.

Another object of the present invention is to take advantage of the unique ability of an MHD generator to provide a sine wave distribution of voltage and current around the periphery of a circular duct or channel.

A further object of the present invention is to provide an MHD generator particularly suited for producing polyphase as well as single phase current.

Another objective of the present invention is to provide in combination with an MHD generator means for providing relative motion between the magnetic field and electrodes in the MHD generator duct.

A still further object of the present invention is to provide an MHD generator having a naturally smooth sine wave output.

A still further object of the present invention is to provide an MHD generator that is tolerant of changes in the power factor of a load.

The novel features that I consider characteristic of my invention are set forth in the appendant claims; the invention, itself, however, both as to its organization and method of operation, together with additional objects and advantages thereof, will best be understood from the following description of specific embodiments when read in conjunction with the accompanying drawings, in which:

FIGURE 4 is a fragmentary perspective view of translating apparatus including slip rings, a rotary distributor, and driving motor, interconnecting the MHD generator electrodes and an output circuit;

FIGURE 5 is a perspective view with parts broken away showing the rotary distributor in greater detail;

FIGURE 8 is a diagrammatic illustration of a modification of FIGURE 7;

Figure 12:
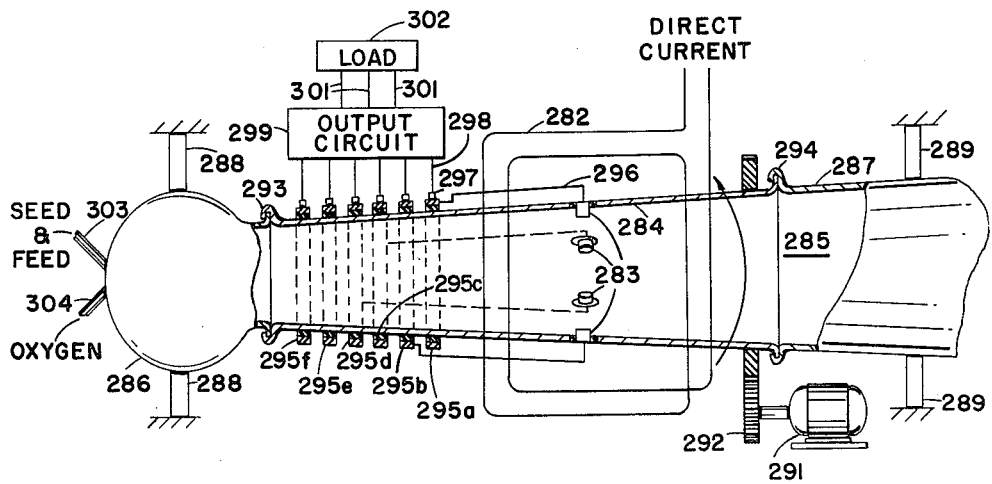
FIGURE 12 is a simplified diagrammatic and sectional view with parts broken away of an MHD generator having a fixed and constant magnetic field and rotatable electrodes in accordance with the principles of the present invention.
Figure 13:
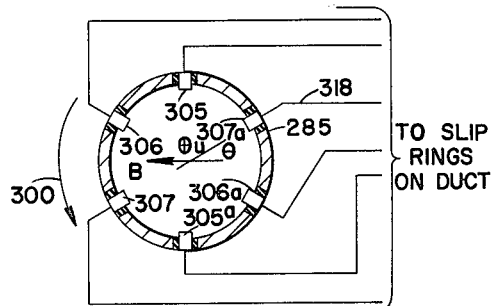
Figure 14:
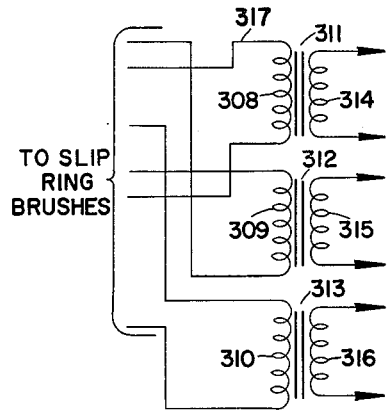
Figure 15:
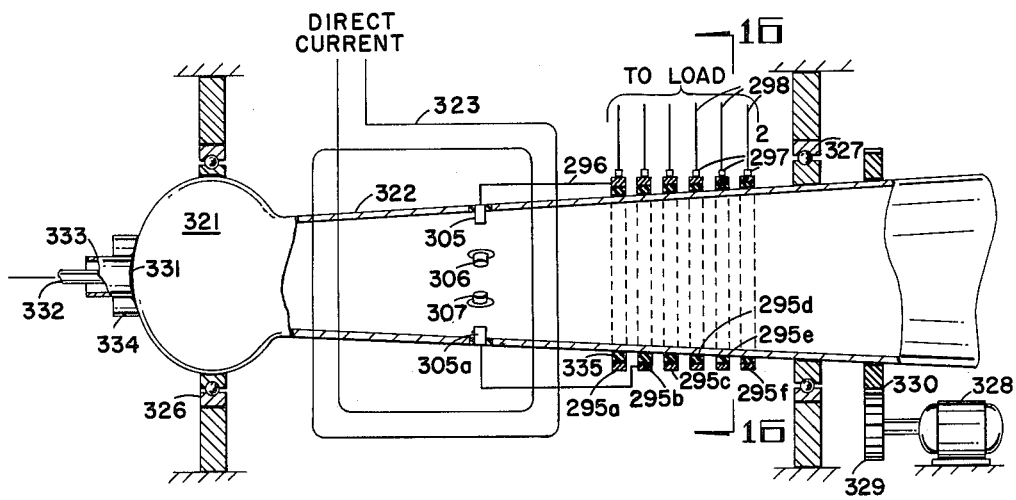

FIGURE 13 is a simplified diagrammatic and sectional view of an MHD generator duct wherein a portion of the generator duct and electrodes contained therein is rotated, and the electrodes are electrically connected to slip rings carried by the duct for providing different currents under the influence of the electromotive force within the duct, in accordance with the principles of the present invention;

FIGURE 14 is a simplified diagrammatic illustration of an output circuit for providing a polyphase output wherein the input terminals of the output circuit are connected to brushes cooperating with the slip rings indicated in FIGURE 13;

FIGURE 15 is a simplified diagrammatic and sectional illustration of a modification of FIGURE 12;

FIGURE 16 is a sectional view taken on line 16—16, FIGURE 15; and

FIGURE 17 is a simplified fragmentary and sectional view of an MHD generator having fixed electrodes and a rotatable magnetic field in accordance with the principles of the present invention.

Figure 1:
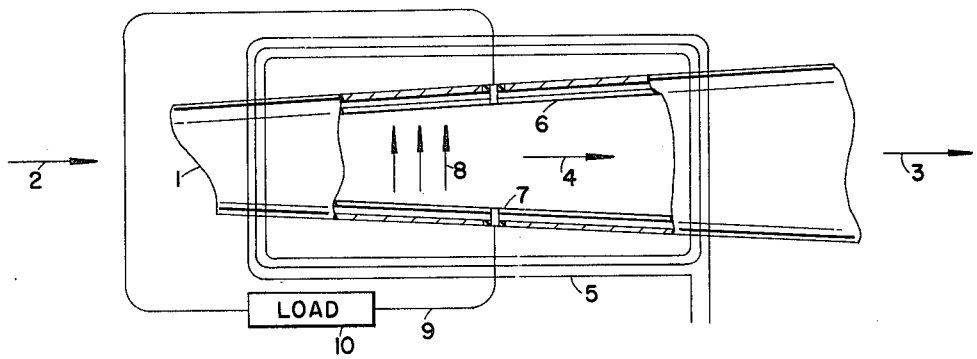
FIGURE 1 is a simplified diagrammatic illustration of an MHD generator.

A knowledge of the general principles of MHD generators will promote an understanding of the present invention. For this reason, there is shown in FIGURE 1 a schematic diagram of an MHD generator. As illustrated in that figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the dust is lower than at its inlet; and for this reason the plasma moves at high velocity through the duct, as indicated by the arrow at 4. By properly choosing the pressure differential and shape of the duct, the plasma can be made to move through the duct at substantially constant velocity, which is desirable although not necessary to the operation of the generator. Surrounding the exterior of the duct is a continuous electrical conductor in the form of a coil 5 to which a unidirectional electrical current may be supplied from any conventional source or from the generator itself. Flow of electrical current through the coil establishes a magnetic flux through the duct perpendicular to the direction of plasma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux. High velocity movement of the electrically conductive plasma through the magnetic field induces a unidirectional E.M.F. between the electrodes, as indicated by the arrows at 8. The electrodes 6 and 7 are connected by conductor 9 to a load 10 through which electrical current flows under the influence of the E.M.F. induced between the electrodes.

From the foregoing description it will be immediately recognized that the MHD generator, as described, inherently produces a flow of direct current through the load. Although this is entirely satisfactory for many purposes, modern power transmission systems obviously require a generating installation capable of producing alternating current, preferably three phase alternating current. Such an MHD installation is shown in FIGURE 3, to which reference will be made later herein.

Figure 2:
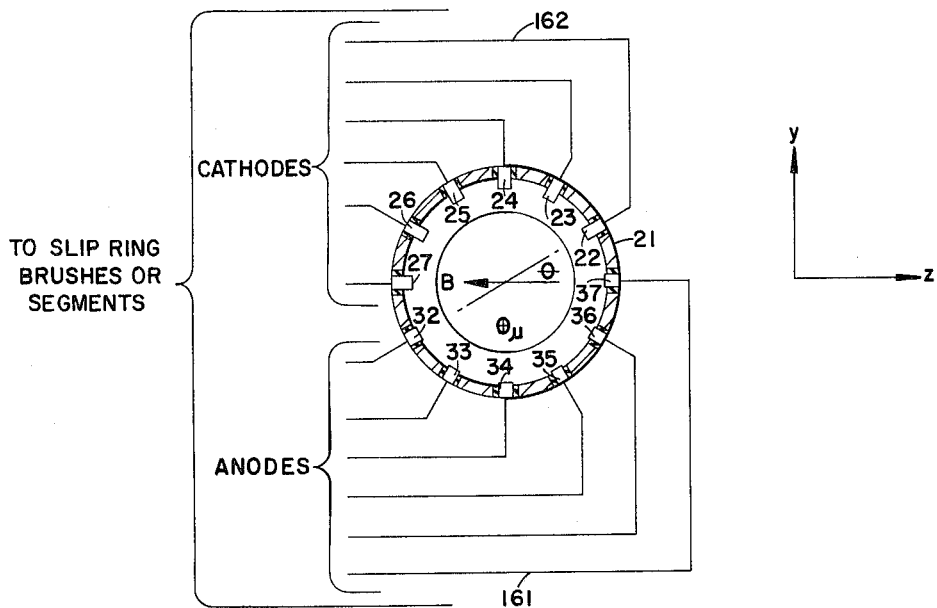
FIGURE 2 is a simplified diagrammatic and sectional view of an MHD generator duct and electrodes for providing different currents under the influence of the electromotive force within the duct in accordance with the principles of the present invention.

As has been previously pointed out, the present invention utilizes the unique ability of an MHD generator to provide a sine wave distribution of voltage and current around the periphery of a circular MHD generator duct. Shown in FIGURE 2 is an MHD generator having a circular duct 21 and an improved arrangement of electrodes in accordance with the present invention which provides the above mentioned ability or characteristic. As illustrated in FIGURE 2, a plurality of pairs of equally spaced electrodes are disposed within and insulated from the circular duct. These pairs of electrodes are disposed on nonparallel axes transverse of the lengthwise axis of the duct. One electrode of each pair is a cathode and the other is an anode. The cathodes are constructed to emit electrons readily, but the anodes need not emit electrons. As indicated by the small brackets in FIGURE 2, electrodes 22–27 function as cathodes, and the electrodes 32–37 diametrically opposite each of the cathodes function as anodes. As indicated by the large bracket, both the anodes and cathodes are coupled to slip ring brushes as and for the purposes hereinafter described. Consider now any pair of opposed electrodes such as, for example, electrodes 22 and 32, making an angle $\theta$ with the magnetic field B. The magnetic field B and the velocity $u$ of gas movement is considered to be uniform throughout the duct and in the direction indicated in FIGURE 2. The above conditions being present, the voltage between different opposed electrodes will tend to vary as sine $\theta$, i.e., if the voltage between electrodes 24 and 34 is $V_o$, then the voltage $V_1$ between electrodes 22 and 32 is $V_o$ sine $\theta$. The electrodes are uniformly spaced around the duct. Thus, a given number of electrodes or a given fixed area of electrode surface will have a projected area on the Z axis, i.e., the axis perpendicular to the direction of current flow, proportional to sine $\theta$ and hence will tend to pick up a current proportional to sine $\theta$.

Thus, assume the existence of a duct with equally spaced electrodes all around as shown in FIGURE 2; and that each electrode is in continuous electrical connection with a segment of a rotary distributor or commutator, that at least a pair of oppositely disposed brushes cooperating with said rotary distributor is in continuous electrical connection with the primary of an output transformer, and that suitable means provides relative motion of the segments with respect to the brushes. For the reasons discussed hereinabove, upon rotation of either the segments or the brushes an in-phase sine wave output of current and voltage will result having a smoothness which may be made very good by using a large number of small segments and brushes and the usual smoothing reactances. It is important to note that for such an arrangement the voltage jump and the current interrupted as a brush breaks circuit with a segment can be made as small as circumstances may require. Further, the connection of a capacitor between each segment will reduce sparking still further. It is also important to note that in such an arrangement a brush does not have to switch one-half the full D.C. current during commutation as does a brush in a bi-polar D.C. machine.

Figure 3:
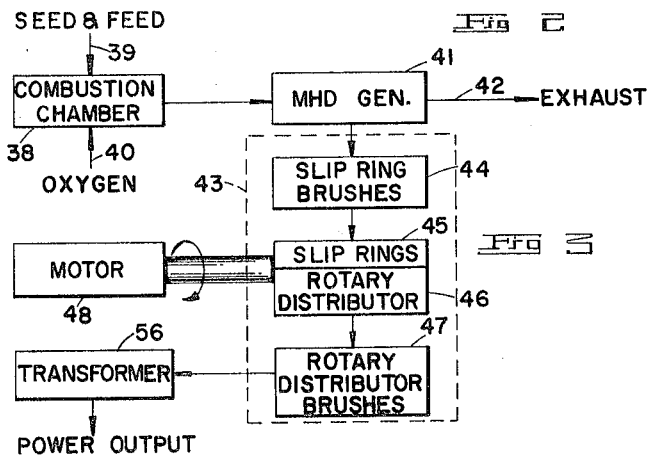
FIGURE 3 is a block diagram illustrating one type of alternating current MHD generating system.

In FIGURE 3 there is illustrated in block diagram form apparatus, including rotating segment apparatus, for coupling to an output circuit the currents of different magnitudes under the influence of the electromotive force within the generator as described hereinabove and available at each pair of oppositely disposed electrodes. As shown in FIGURE 3, fuel, including an easily ionizable impurity (seed), introduced into combustion chamber 38, as indicated at 39, is burned in the presence of oxygen introduced into the combustion chamber 38 as indicated at 40. In order to develop within the combustion chamber a plasma of sufficiently high temperature, oxygen or oxygen-enriched air may be introduced into the combustion chamber. Alternately, preheated air may be used in place of oxygen, In such a case, the air is aspirated from the atmosphere by a turbocompressor (not shown) and passed through a preheater (not shown) before introduction into the combustion chamber.

The hot, electrically conductive plasma from the combustion chamber is introduced directly into the MHD generator 41. After expansion in the MHD generator 41 to a lower temperature, the plasma constitutes a working fluid of relatively poor electrical conductivity. This working fluid may be exhausted to a heat sink as indicated at 42, such as the atmosphere, or to a conventional steam generating plant.

Electrodes in the generator arranged and adapted, for example, as shown in FIGURE 2 are coupled to an output circuit by translating apparatus hereinafter described interconnecting the electrodes and the output circuit. As shown in FIGURE 3, the aforementioned output circuit is comprised of a transformer 56 and the translating apparatus 43 may comprise slip ring brushes 44, slip rings 45, a rotary distributor 46, and distributor brushes 47. Each electrode in the MHD generator is electrically connected to the brush of a slip ring, the slip ring being electrically connected to a conducting segment of the rotary distributor. The slip rings and conducting segments are mounted on a common shaft which is rotatably driven by a suitable motor 48. If the conducting segments have the same relationship one to another as that of the electrodes, rotation of the conducting segments by means of a synchronous motor or the like past a plurality of oppositely disposed brushes cooperating with the rotary distributor and electrically connected to the output circuit will sequentially couple each pair of oppositely disposed electrodes to the transformer or output circuit. Thus, the sequential coupling of the currents of different magnitude and proportional to sine $\theta$ available at each pair of oppositely disposed electrodes, to the output circuit provides an alternating current that is inherently sinusoidal in nature.

Attention is now directed to FIGURE 4, which shows diagrammatically the translating apparatus interconnecting the electrodes 22–27 and 32–37 of FIGURE 2 and the output circuit, and to FIGURE 5 which shows the rotary distributor in greater detail. As pointed out hereinabove, the translating apparatus is comprised of a plurality of copper slip rings 61–72 insulated from and concentrically and fixedly mounted on a shaft 73, a motor 74 for rotatably driving the shaft 73, and a rotary distributor 75. The rotary distributor, more completely shown in FIGURE 5, is provided with conducting segments 82–87 and 92–97 made of wedge-shaped segments of heat-drawn or drop-forged copper, insulated from one another by thin layers 101 of built-up mica cut from segment plate. The conducting segments 82–87 and 92–97 are held together by clamping flanges 102–103 which pull the conducting segments inward when the flanges are drawn together by either through bolts or cap screws 104. The flanges are prevented from short-circuiting the conducting segments by two collars or rings of built-up mica 105. The conductors from the slip ring 61–72 are soldered to the risers 106 forming an integral part of each conducting segment. The function of the brushes 111–116 cooperating with the conducting segments is to carry the current from the conducting segments to the output circuit. The brushes 111–116 are preferably composed of carbon, although they may also be composed of copper gauze or metal-carbon compounds. A brush holder 117 is fastened to the brush stud 118 and holds the brush in its proper position on the rotary distributor. The brush stud 118 is insulated from the rocker arm 119 by means of an insulating bushing 121 and washer 122. The brush should be free to slide in its holder in order that it may follow any irregularities in the rotary distributor and is maintained in electrical contact with the conducting segments by a spring (not shown) which may exert a pressure on the brush of from one to two pounds per square inch. To decrease the electrical resistance, the upper portion of the brush may be copper plated, and this plating is connected to the brush holder 117 by a pigtail 124 made of copper ribbon. The brush is connected through the brush holder to the output circuit. It is to be understood that the above discussion applies to the slip ring brushes as well as the rotary distributor brushes.

Each conducting segment is connected to a separate one of the slip rings by a conductor, which conductors are indicated collectively by the numeral 125, each soldered at its ends to the riser of a conducting segment and to its respective slip ring. A plurality of brushes 131–142 each of which cooperates with a slip ring and is electrically connected via a conductor to an electrode in the MHD generator duct, permits continuous electrical connection between the electrodes and the conducting segments as the rotary distributor 75 is driven by motor 74. Capacitors 143–153 are connected between adjacent slip ring brushes and function to supply a commutating potential which, either alone or in combination with conventional saturable or smoothing reactors (not shown) tend to reduce sparking at the rotary distributor brushes and improve the smoothness of the output voltage and current. Other suitable and conventional means well-known to those skilled in the art may also be used to reduce sparking. In the interest of clarity, some of the slip rings have been omitted in FIGURE 4, but it is to be understood that for rotating segment apparatus a slip ring and brush cooperating therewith is required for each electrode. Similarly, a conducting segment is also required for each electrode, as is a conductor connecting each conducting segment and a slip ring and a conductor connecting each slip ring brush and an electrode. It is important that the conducting segments have the same angular distribution as the electrodes in order to provide a sine wave output at the distributor brushes. This is accomplished by sequentially connecting the electrodes to the slip ring brushes and sequentially connecting the slip rings to the conducting segments. For example, with reference now to FIGURE 2 and FIGURE 4, starting with any electrode, such as, for example, electrode 37 of FIGURE 2, this electrode is connected via conductor 161 to brush 131. The next succeeding electrode in a counterclockwise direction, electrode 22, is connected via conductor 162 to brush 132. In the same manner all the electrodes are sequentially connected to the slip ring brushes. Continuing, slip ring 61 is connected via conductor 163 to conducting segment 97 and slip ring 62 is connected via conductor 164 to conducting segment 82 adjacent conducting segment 97 in a counterclockwise direction. In the same manner all the slip rings are sequentially connected to the conducting segments. From the above discussion it may now be evident that the conducting segments have the same angular distribution as the electrodes. Thus, the separate currents under the influence of the eletromotive force within the MHD generator duct will be sequentially coupled to the output circuit now to be described.

The output circuit as shown by way of example in FIGURE 4 operates to provide three-phase power. This is accomplished by providing three pairs of oppositely disposed, or six equally spaced, brushes 111–116 around the periphery of the rotary distributor 75 that cooperate with the conducting segments to couple current to three transformers 171–173. As shown, each pair of oppositely disposed brushes is connected to the terminals of the primary winding of each transformer. Brushes 115 and 111 are connected to the terminals of primary winding 174 of transformer 171, brushes 116 and 113 are connected to the terminals of primary winding 175 of transformer 172, and brushes 112 and 114 are connected to the primary winding 176 of transformer 173. Since the brushes 111–116 are equally spaced around the periphery of the rotary distributor 75, each pair of oppositely disposed brushes is located on a radius displaced 60° from that of the other two pairs of brushes. Thus, upon rotation of shaft 73 by motor 74 a current having a sine wave variation will be induced in the secondary 177–179 of each transformer, plus or minus 120° out of phase with each of the other two currents. The rotational speed of the motor 74 controls the frequency of the output currents, hence any frequency may be obtained within the limits of the rotational speed of the motor by simply selecting the desired and appropriate rotational speed. The location of the brushes controls phase. Further, by utilization of conventional means and apparatus for maintaining the rotational speed of the motor constant a constant frequency output may be obtained irrespective of the load on the generator. Obviously, if the motor has a rotational speed of 3600 revolutions per minute, current having 60 cycles per second will be available at the secondaries of the transformers. If a single phase output is desired two of the transformers and their associated brushes may be omitted. Similarly, a three phase transformer may be substituted for the three transformers shown and described.

It is desirable to have a current flow in the MHD generator duct that is as uniform as possible in space and time. This requires that at any instant as many electrodes as possible be conducting. A polyphase connection more completely described hereinafter is especially suited to achieve this result. Having a brush that bridges many segments will help accomplish this purpose; however, it will also result in fairly large shorting effects when the angle $\theta$ is small, i.e., the brush is bridging a group of segments which would like to be at substantially different voltages as compared to those segments around $\theta=90°$ or 270° which are at substantially the same voltage anyway. Calculations show that electrodes lying within an angle of about 15° may be bridged by a single brush without serious shorting effects.

Figure 6:
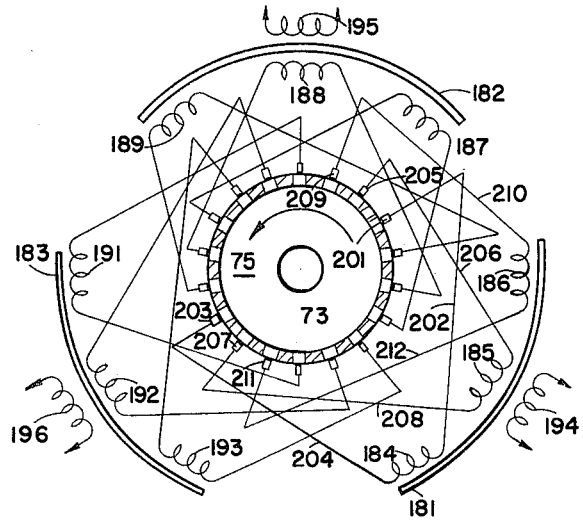
FIGURE 6 is a diagrammatic illustration of an arrangement for providing a polyphase output utilizing brushes all around the rotary distributor.

Attention is now directed to FIGURE 6 which shows diagrammatically and by way of example an arrangement for providing a polyphase output which utilizes fixed brushes all around the rotary distributor. Although not shown for reasons of clarity, from the foregoing discussion it will be understood that each conducting segment is connected to an electrode in the MHD generator duct, that the electrodes and the conducting segments have the same angular distribution; and that the conducting segments are caused to rotate past the brushes or vice versa at the required velocity by a synchronous motor or the like. As will be more completely described hereinafter, the distributor may be fixed and the brushes cooperating therewith rotated around the distributor. In such a case the generator electrodes are directly connected to the conducting segments of the distributor and the brushes cooperating with the distributor are connected through slip rings and slip ring brushes to the output circuit. For illustrative purposes the output circuit is shown in FIGURE 6 as comprising three transformers 181–183, each having respectively a group of three primary windings 184–186, 187–189, 191–193 and one secondary winding 194–196 wound on a common transformer core. The three secondary windings 194–196 comprising part of the output circuit may easily be connected in any of the known arrangements for polyphase power. Each pair of oppositely disposed brushes is sequentially connected to the terminals of the successive primary windings of each transformer. For example, brush 201 on the right-hand half of the rotary distributor 75 is connected via conductor 202 to one terminal of primary winding 184 of transformer 181, and brush 203 on the opposite or left-hand half of the rotary distributor is connected via conductor 204 to the other terminal of primary winding 184. Similarly, the next succeeding brush 205 adjacent to brush 201 in a counterclockwise direction is connected via conductor 206 to one terminal of the second or next succeeding primary winding 185 of transformer 181, and brush 207 which is adjacent to brush 203 is connected via conductor 208 to the other terminal of primary winding 185. The next succeeding brush on the right-hand half of the rotary distributor, i.e., brush 209 adjacent to brush 205 is connected via conductor 210 to one terminal of the third primary winding 186 of transformer 181 and the next succeeding brush on the left-hand half of the rotary distributor, i.e., brush 211 adjacent to brush 207 is connected via conductor 212 to the other terminal of the third primary winding 186. In like manner traveling in a counterclockwise direction, the remaining brushes are sequentially connected to the remaining primary windings.

For the embodiment disclosed in FIGURE 6 it may be seen that each primary winding within a group is out of phase with the other primary windings of this group by 40°, but that they add up to a single phase output in the secondary winding. Further, with conventional connection of the three secondaries to provide the proper polarity, the output of each of the three secondaries will be plus or minus 120° out of phase with the output of the other two secondary windings. This results in conventional three phase power and in a substantially uniform current flow in the duct for substantially all of the time. From the above it may now be apparent that as compared with conventional rotating machinery the present invention utilizes oppositely disposed brushes all around the rotary distributor so that the total fraction of the time that any one segment conducts is large. By way of comparison, conventional rotating machinery utilizes only one brush per pole. Thus, if desired, the rotary distributor of the present invention, for a given power output, can be made smaller than the commutator of a conventional D.C. machine.

It will be readily appreciated by those skilled in the art that while three groups of three primaries have been shown as wound on separate common transformer cores having a single secondary winding, the invention is not so unlimited. For example, it may in practice be more desirable to use an even number of windings per phase because of the occurrence of harmonic distortion or other effects, well-known to those skilled in the art, that arise in engineering applications of polyphase circuitry. Additionally, a number of transformers other than three may be used, the only limitation being that the voltages induced in the primaries add up to the desired number of output voltages at the desired phase angle. Such an arrangement has the desirable advantage of reducing still further the voltage pump and the current that is interrupted as a brush leaves a segment.

The use of multiple phases such as, for example, nine phases also functions to reduce ripple in the generator duct thereby rendering it more efficient and more equally distributes the load on the electrodes and the brushes.

Figure 7:
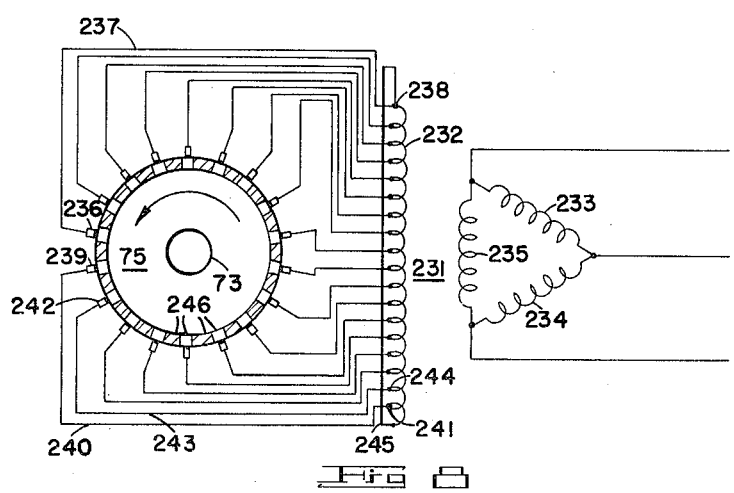
FIGURE 7 is a fragmentary transverse sectional view showing on an enlarged scale the brushes and conducting segments of FIGURE 6.
Figure 7:
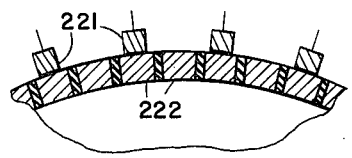

In practice it may be desirable to provide about one-half as many brushes as there are conducting segments, as is best shown in FIGURE 7. Stating it another way, the brushes 221 cooperating with the conducting segments 222 may cover about one-half the total segment surface as shown in FIGURE 7, so that as the segments are moving from one brush to the next or vice versa a short circuit does not exist around the entire distributor. It is to be understood, however, that the provision of brushes covering a plurality of segments is not excluded so long as the distance between brushes is greater than one segment width to prevent the existence of a short circuit around the distributor.

Attention is now directed to FIGURE 8 which shows diagrammatically and by way of example a modification of the arrangement shown in FIGURE 6 for providing a polyphase output which utilizes brushes all around the rotary distributor 75. As was pointed out in connection with FIGURE 6, although not shown for reasons of clarity, it is to be understood that each conducting segment is connected to an electrode in the MHD generator duct, that the electrodes and the conducting segments have the same angular distribution, and that the conducting segments and the brushes are rotated with relation to each other at the required velocity by a synchronous motor or the like.

It will be noted that the construction, arrangement, and location of the rotary distributor and the brushes cooperating therewith of FIGURE 8 are identical with that shown and described in connection with FIGURE 6. However, as shown in FIGURE 8, the three transformers have been replaced by a single transformer 231 having a continuous or ring type primary winding 232 and three secondary windings 233–235. The ring type primary winding 232 is provided with a plurality of taps, each tap being sequentially connected to a different brush. For example, brush 236 is connected via conductor 237 to tap 238. Proceeding in a counterclockwise direction, brush 239, adjacent brush 236, is connected via conductor 240 to tap 241 and brush 242, adjacent brush 239, is connected via conductor 243 to tap 244. By reason of conductor 245 connecting the ends of the primary winding intermediate taps 238 and 241, it will be understood that tap 238 is in fact adjacent tap 241. In like manner, each of the remaining brushes are sequentially connected to each of the remaining taps.

It may now be clear that each succeeding brush as shown in FIGURE 8 is connected sequentially to the taps provided on the primary winding 232. Upon provision to each pair of oppositely disposed conducting segments 246 of the currents of different magnitude under the influence of the electromotive force in the generator duct in the manner hereinbefore described, in effect a wave of current and voltage will be caused to continuously travel around the primary winding 232 which will induce in conventional manner a three-phase output in the three secondary windings 233–235.

In order to maintain sparking at a minimum as a conducting segment breaks contact with a brush, a commutating capacitor (not shown) may be attached between the adjacent conducting segments. To avoid having the commutating capacitors connected to a rotating member, they may be conveniently connected between the slip ring brushes as shown in FIGURE 4. If a rotating brush arrangement is used, the commutating capacitors may be connected between the electrodes.

Figure 9:
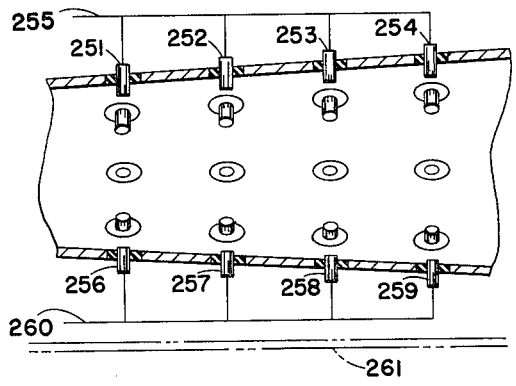
FIGURE 9 is a longitudinal sectional view through an MHD generator having electrodes arranged in accordance with the principles of the present invention.

FIGURE 9 illustrates the fact that several electrodes may be used at any longitudinal plane of the MHD generator duct. Thus, in FIGURE 9 four electrodes 251–254 may be used in place of electrode 24 shown in FIGURE 2. Each set of longitudinally disposed electrodes may be connected in parallel to a conductor in the same manner that electrodes 251–254 are connected in parallel to conductor 255 which may be connected to the brush (not shown) of a separate slip ring assembly as and for the purposes described hereinbefore. Similarly, electrodes 256–259 may replace electrode 34 of FIGURE 2 and may be connected in parallel to conductor 260 which may be connected to the brush of a different slip ring assembly. Thus, it will be noted that whereas individual opposed electrodes 24 and 34 are illustrated in FIGURE 2 these may actually comprise a plurality of electrodes arranged in a longitudinal plane and connected in parallel and to separate brushes of a slip ring assembly.

Suggested diagrammatically by phantom lines is an electric coil 261 which provides a uniform magnetic field transverse of the generator duct and perpendicular to the gas stream. This magnetic field may be provided in a number of different ways. While the exact structure or means for providing a uniform magnetic field is not essential to the present invention, by way of example, such a magnetic field may be provided by winding the electric coil in essentially the same manner as that used to wind deflection coils for television picture tubes. The art of winding television deflection coils is well-known, as is the fact that they function to provide a uniform magnetic field in the neck of the television picture tube.

An arrangement of electrodes as shown in FIGURE 9 assures full utilization of the cross section of the duct for formation of current paths through the gas stream.

If desired, each set of radial and oppositely disposed electrodes as shown in FIGURE 9 may be connected to separate distributors and supply current thereto in the same manner as described hereinbefore. This arrangement may be desirable if the Hall effect is present in the generator duct. Since such a modification is obvious from the foregoing description, it is not believed that it is necessary that it be illustrated.

The specific physical form of the electrodes shown in FIGURE 2 and FIGURE 9 is not critical to the present invention. For convenience, the electrodes that function as a cathode have been shown as relatively long rods, and the electrodes that function as anodes have been shown as short rods. The cross sectional form of the rods or their shape in a direction parallel to their length is not deemed material, since the benefits of the invention can be realized regardless of the form of the electrode confiuration. Likewise the material of the electrodes constitutes in no way a limitation of the invention. Such electrodes may be made from refractory metals, stainless steel, or from copper, if internal cooling is provided. Further, the longitudinal electrodes need not necessarily be segmented and may comprise a single electrode extending substantially the length of the generator duct if no Hall effect is present.

Figure 10:
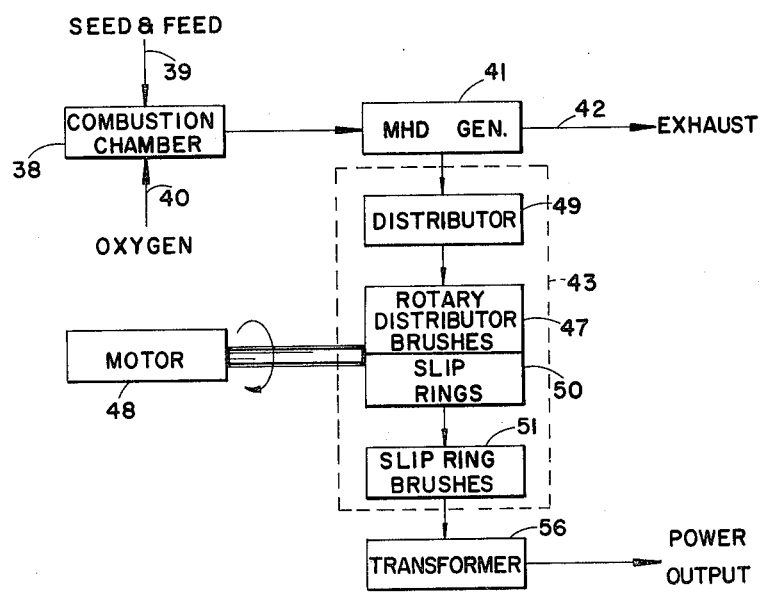
FIGURE 10 is a block diagram illustrating another type of alternating current MHD generating system wherein the rotary distributor brushes are rotated.

A rotating brush arrangement comprising a modification of the rotating segment arrangement of FIGURE 3 is shown in block diagram form in FIGURE 10, like reference numerals indicating like components. The introduction of fuel, seed, and oxygen to the combustion chamber 38 and the introduction of the plasma from the combustion chamber 38 to the MHD generator 41 as shown in FIGURE 10 has been discussed in connection with FIGURE 3 and is identical therewith as is the arrangement of electrodes in the MHD generator 41. However, whereas each electrode in the MHD generator of FIGURE 3 is connected to the brush of a slip ring, as indicated in FIGURE 10, each electrode in the MHD generator is directly connected to a conducting segment of a distributor 49 identical to rotary distributor 46 except that it remains stationary and is not rotated. The conducting segments of distributor 49 and the electrodes have the same relationship discussed in connection with FIGURE 3. Rotary distributor brushes 47 and slip rings 50 are mounted on a common shaft which is rotatably driven by motor 48. Brushes 51 cooperates with the slip rings 50 to couple the rotary distributor brushes 47 to the output circuit comprised of transformer 56. It may now be apparent that whereas in the rotating segment arrangement indicated in FIGURE 3 the distributor is rotated and the brushes cooperating therewith are not rotated, in the rotating brush arrangement indicated in FIGURE 10 the operation is reversed, i.e., the distributor is not rotated while the brushes cooperating therewith are rotated around the distributor. It is equally apparent that in either case the current supplied to transformer 56 will be identical. The arrangement as indicated in FIGURE 10 may, for example, be found advantageous over that indicated in FIGURE 3 because a lesser number of slip rings and slip ring brushes will be required thereby resulting in a simpler and less expensive translating apparatus for generators having a large number of electrodes. Assuming the use of the maximum number of distributor brushes, which is to say the use of one-half as many distributor brushes as there are electrodes and hence conducting segments, it is obvious that the rotating brush structure will require only one-half as many slip rings as the rotating segment structure. Although not required on the rotating segment structure, the rotating brush structure will require suitable means to overcome centrifugal force exerted on the brushes during rotation thereof. Since the brushes will normally be rotated at a constant speed, this may be easily achieved, for example, by selection of the proper spring force exerted on the brushes or the application of a force to the brushes equal and opposite to the centrifugal force exerted on the brushes irrespective of its direction.

Figure 11:
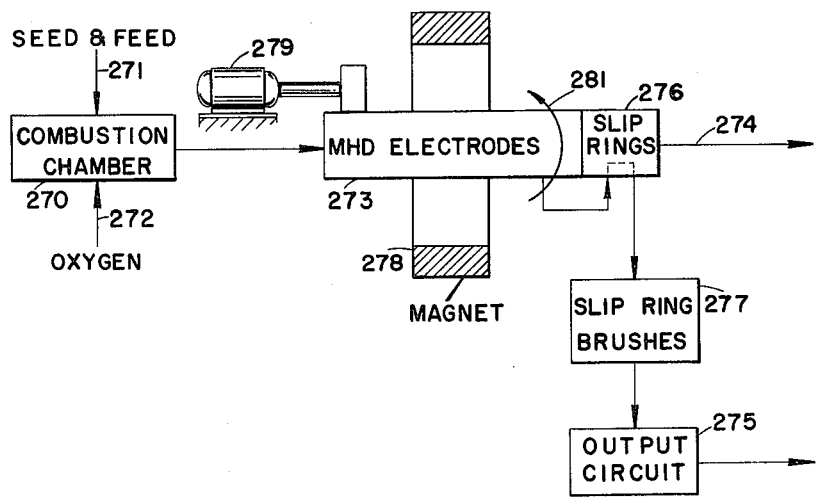
FIGURE 11 is a block diagram illustrating one type of alternating current MHD generating system.

In FIGURE 11 there is illustrated in block diagram form an MHD generator wherein a sine wave output is automatically or naturally produced. As shown in FIGURE 11, fuel, including an easily ionizable impurity (seed) introduced into combustion chamber 270, as indicated at 271, is burned in the presence of oxygen introduced into the combustion chamber 270 as indicated at 272. In order to develop within the combustion chamber a plasma of sufficiently high temperature oxygen or oxygen-enriched air may be introduced into the combustion chamber. Alternately, preheated air may be used in place of oxygen. In such a case, the air is aspirated from the atmosphere by a turbocompressor (not shown) and passed through a preheater (not shown) before introduction into the combustion chamber.

The hot, electrically conductive plasma from the combustion chamber is introduced directly into the MHD generator duct. After expansion past the MHD electrodes 273 to a lower temperature the plasma constitutes a working fluid of relatively poor electrical conductivity. This working fluid may be exhausted to a heat sink as indicated at 274, such as the atmosphere, or to a conventional steam generating plant. Electrodes 273 are rotated by motor 279 as indicated by arrow 281. Oppositely disposed electrodes arranged and adapted as shown more fully in FIGURE 13 are coupled to an output circuit 275 via slip rings 276 which may be carried on the duct and slip ring brushes 277 cooperating with the slip rings 276. Means 278 for forming a magnetic field through the generator suround the electrodes 273. As shown in FIGURE 14, the aforementioned output circuit for three-phase power may be comprised of three transformers or, if desired, a single three-phase transformer. Thus, the coupling of the current available at each pair of electrodes via the slip ring and slip ring brushes to the output circuit provides an alternating current that is substantially smooth and sinusoidal in nature.

Attention is now directed to FIGURE 12 which shows diagrammatically in simplified form an MHD generator wherein a magnetic coil 282 is supplied with direct current as shown and rotation of the electrodes 283 with respect to the magnetic field is accomplished by rotation of a portion 284 of a circular duct 285 containing the electrodes. The combustion chamber, or high pressure-high temperature portion 286 of the generator and the duct exit or low pressure-low temperature portion 287 of the generator are maintained in a fixed and coaxial position by supports 288 and 289. The circular portion 284 of the duct intermediate and coaxial with the combustion chamber and the duct exit of the generator is rotatably driven by motor 291 through gears 292. For large installations the rotatable portion 284 of the duct may be supported by bearings (not shown) of the type, for example, shown in FIGURE 15. Suitable rotary seals 293–294, for example, of the labyrinth type used on turbines prevent escape of the plasma at the junctions of the rotary and nonrotary portions of the generator.

Within the rotatable portion of the duct are provided a plurality of insulated opposed electrodes 283, more fully described in connection with FIGURE 13. These electrodes may, if desired, extend along the interior of the duct parallel to the direction of plasma movement. Rotation of the electrodes 283 about the longitudinal axis of the generator and high velocity movement of the electrically conductive plasma through the magnetic field provided by coil 282 induces between the electrodes a varying E.M.F. more fully explained hereinafter. A plurality of insulated slip rings 295a–295f are carried by the rotatable portion 284 of the duct. The upper electrode is connected via conductor 296 to slip ring 295a. In like manner each of the remaining electrodes are connected to one each of the remaining slip rings 295b–295f. Brushes cooperating with the slip rings are provided to couple the slip rings to an output circuit. Brush 297 cooperating with slip ring 295a is connected via conductor 298 to the output circuit 299. In like manner each of the remaining brushes are connected to the output circuit. The output circuit 299 is connected as by conductors 301 to a load 302 through which electrical current flows under the influence of the E.M.F. induced between the electrode in the duct.

Fuel, including an easily ionizable impurity (seed), is introduced into the combustion chamber 286, as indicated at 303, and is burned in the presence of oxygen introduced into the combustion chamber 286, as indicated at 304.

Generation of the alternating current output in accordance with the present invention may be best explained by first considering the conventional generation of generated electromotive forces which may be thought of as analagous. For the classical generation of an electromotive forec, consider now a coil situated in the uniform portion of a magnetic field in an air gap between two pole faces and assume that the flux density in the gap is constant in value. The plane of the coil is perpendicular to the flux lines and is mounted symmetrically on a shaft perpendicular to the flux lines and the coil is caused to revolve in this uniform field. The magnitude of the E.M.F. generated in the coil is proportional to the component of the peripheral velocity $v$ at right angles to the flux-density vectors, both the flux-density and the length of the two coil sides, which are perpendicular to the field, being assumed constant. If the coil is revolved at a uniform, angular velocity $\omega$ radius per second, the angle $\theta$ between the coil and the perpendicular is varied uniformly with time ($\theta = \omega t$), the component of the peripheral velocity at right angles to the flux is proportional to sine $\theta$, and the instantaneous E.M.F. $e$ generated in a one turn coil is then $$e = v \sin \omega t$$

If this situation is examined at various points in the revolution of the coil, it will be seen that when the coil is parallel to the flux lines, the factor $$v \sin \omega t$$

becomes a maximum and equal to $v$. At this time it is commonly said that the coil sides are "cutting flux lines" at a maximum rate and the instantaneous E.M.F. has a maximum value.

At the time the coil is at right angles to the flux the peripheral velocity of the coil sides has no component at right angles to the flux, hence the E.M.F. is zero at this instant. If $\theta$ is measured from the instant the coil is at right angles to the flux and values of the generated E.M.F. as ordinates with time as abscissas are plotted, the wave form of the generated E.M.F. will be obtained.

With reference now to the present invention, when a pair of electrodes are perpendicular to the magnetic field, a maximum voltage will be generated between them, and when they are parallel to the magnetic field, the voltage will be zero. With reference now to FIGURE 13, if we measure $\theta$ from the instant a pair of electrodes are parallel to the flux and plot values of the generated E.M.F. as ordinates with time as abscissa, we will obtain the wave form of the generated E.M.F. between the aformentioned pair of electrodes.

Shown in FIGURE 13 is an MHD generator having a circular duct 285 and an improved arrangement of electrodes which provides the aforementioned sine wave distribution of voltage and current around the periphery of the circular duct. As illustrated in FIGURE 13, a plurality of pairs of equally spaced electrodes 305–307 and 305a–307a are disposed within and insulated from the circular duct. Each electrode, depending upon its radial position, functions alternately as a cathode and then as an anode. The electrodes are constructed to emit electrons when required. Consider now any pair of opposed electrodes such as, for example, electrodes 307 and 307a, making an angle $\theta$ with the magnetic field B. The magnetic field B and the velocity $u$ of gas movement is considered to be uniform throughout the duct, and in the direction indicated in FIGURE 13. The above conditions being present, it may now be obvious that as the electrodes are rotated with respect to the magnetic field as indicated by the arrow 300 a maximum electromotive force will be generated between electrodes 305 and 305a, then a maximum electromotive force will be generated between electrodes 307 and 307a, and then a maximum electromotive force will be generated between electrodes 306 and 306a. When the duct has been rotated 180°, which is to say the position of the electrodes as shown in FIGURE 13 are reversed, maximum electromotive forces of opposite polarity will be consecutively generated between electrodes 305 and 305a, 307 and 307a and 306 and 306a in the manner described immediately hereinbefore. Since the electrodes are spaced 60° apart one with another, it is obvious that, for example, three phase power is available. As indicated in FIGURE 13, each electrode is connected via a conductor 318 to slip rings (see FIGURE 12) carried by the rotating duct. As indicated in FIGURE 14, the primary windings 308–310 of transformers 311–313 for supplying three phase power at the desired voltage are connected via conductors 317 to slip ring brushes (see FIGURE 12) cooperating with the slip rings on the rotating duct. Output current is, of course, taken from the secondary windings 314–316.

Although six electrodes have been shown by way of example in FIGURE 13, it is to be understood that a lesser or greater number of electrodes may be used, dependent upon whether a polyphase output is desired, and whether a group of primary windings for one phase is desired, as has been previously discussed.

It is to be understood that the location of the slip rings is shown by way of example only and that they need not necessarily be located and arranged as shown in FIGURE 12. For example, they may be located adjacent the exit of the duct as shown in FIGURE 15 or, if desired, the combustion chamber may be axially supported to permit extension of the rotatable portion 284 of the duct by any suitable means for location of the slip rings around or behind the combustion chamber. Location of the slip ring behind the combustion chamber has the advantage of permitting the use of slip rings having a small diameter as compared to that of the duct and hence a lower tip speed of the slip rings for the case of a duct having a large diameter.

Tip speed of the slip rings may also be reduced by providing slip rings having a small diameter and in electrical connection with conducting rings carried on a common shaft located adjacent the generator. In this case the conducting rings may have the same diameter as slip rings 295a–295f and be in electrical and driven connection therewith. Thus, output power may be taken from slip rings having a small diameter irrespective of the diameter of the duct, the electrical paths from the electrodes to the small slip rings now comprising the conductors connecting each of the electrodes to one of the slip rings 295a–295f; the slip rings 295a–295f on the duct; an equal number of circular conducting rings each in electrical connection with, of the same diameter as, and driven by one of the said slip rings 295a–295f; and the conductors connecting each of the small slip rings to one of the conducting rings.

With reference now to FIGURES 15 and 16, there is shown an MHD generator comprising a combustion chamber 321 integral with a tapered circular duct 322. High temperature, high pressure electrically conductive plasma from the combustion chamber 321 is introduced through the small end of the duct and is exhausted from the large end. Surrounding and spaced away from the exterior of the duct is a continuous electrical conductor in the form of a coil 323 to which a unidirectional electric current may be supplied from any conventional source (not shown). As best shown in FIGURE 16, coil 323 is comprised of two oppositely disposed and serially connected portions 324 and 325 spaced a short distance away from the duct 322. Although the exact configuration of portions 324 and 325 will be determined by design requirements which can vary within wide limits, they are shown as being generally concentric about the longitudinal axis of the duct and of a width generally equal to the diameter of the duct at all points along the length of each portion to provide uniform magnetic flux through the duct perpendicular to the direction of plasma or gas flow and electrodes 305 and 305a in the position as shown in FIGURE 16. Oppositely disposed electrodes 305–307 and 305a–307a identical to those described in connection with FIGURE 13 are provided within the duct. The MHD generator is supported for rotation about its longitudinal axis on bearings 326 and 327 at, respectively, the combustion chamber and the exit portion of the duct. The combustion chamber and duct are rotatably driven by motor 328, as a unit, through gears 329 and 330. An axial opening 331 is provided at the extreme end of the combustion chamber remote from the duct to receive concentric pipes 332 and 333. Fuel and seed, for example, may be supplied to the combustion chamber through pipe 333 and oxygen through pipe 332 to support combustion within the combustion chamber. A circular seal 334, preferably of the high temperature type, such as a labyrinth type seal used with turbines, prevents leakage of the products of combustion through opening 331 during rotation of the combustion chamber and the duct. Fixedly attached to and located at the end of the duct remote from the combustion chamber are slip rings 295a–295f. Each slip ring is insulated from the duct by suitable insulating material 335. Conductor 296 provides electrical connection between electrode 305 and slip ring 295a. In the like manner each of the remaining electrodes are connected to the remaining slip rings. A load may be coupled to the slip rings through conductors 298 and brushes 297.

From the foregoing description it will be immediately recognized that rotation of the electrodes in the magnetic field by motor 328 during high velocity movement of the electrically conductive plasma through the magnetic field will inherently provide an alternating current output having a natural sinusoidal configuration at the slip ring brushes 297.

Attention is now invited to FIGURE 17, which illustrates another embodiment of the present invention, wherein the magnetic coil is supplied with direct current through slip rings 341 and 342 and slip ring brushes 343 and 344, and rotation of the electrodes with respect to the magnetic field is accomplished by rotation of the magnetic coil. The duct and electrodes are in all respects identical to that described in connection with FIGURE 15 and perform the same function of inducing an electromotive force between the electrodes to supply electric current to a suitable load. By reason of the fact that the duct is not rotated, the electrodes may be directly connected as by conductors 345 to a load or an output circuit (not shown).

The coil for providing the magnetic field as decribed in connection with FIGURES 15 and 16 is comprised of two oppositely disposed portions 346 and 347 wound to provide a uniform magnetic field within the duct perpendicular to the direction of gas movement. However, instead of being wound on a nonrotatable support, as is the case for the embodiment illustrated at FIGURES 15 and 16, the two portions 346 and 347 of the coil, as shown in FIGURE 17, are wound on a support 348 having the same configuration as that of the duct which generally is in the form of a truncated cone. The internal diameter of the magnetic coil support 348 is selected to be sufficiently larger than the outside diameter of the duct 322 to provide clearance and permit connection of the electrodes to a load or output circuit. The magnet coil support 348 is supported for rotation about its longitudinal axis, which is coincident with the longitudinal axis of the duct, on bearings 351 and 352. Fixedly attached to and located at one end of the support 348 adjacent one end of the coil are the insulated slip rings 341 and 342. Each slip ring is insulated from the support 348 by insulating material 353. Each slip ring is connected to one terminal of the coil and direct current is supplied thereto through conductors 354 and slip ring brushes 343 and 344. The magnet coil is rotatably driven by motor 355 through gears 356 and 357.

From the foregoing description it will be immediately recognized that rotation of the magnetic field about the electrodes during high velocity movement of the electrically conductive plasma through the magnetic field will inherently provide an alternating current output at the slip ring brushes having a natural sinusoidal configuration substantially identical to that provided by the embodiment described in connection with FIGURE 12 or FIGURE 15.

The various features and advantages of the invention are thought to be clear from the foregoing description. Various other features and advantages not specifically enumerated will undoubtedly occur to those versed in the art, as likewise will many variations and modifications of the embodiments of the invention illustrated, all of which may be achieved without departing from the spirit and scope of the invention as defined by the following claims.

I claim:

1. In a magnetohydrodynamic generator for generating an electromotive force, a duct, means to establish transversely of said duct a magnetic field fixed in position with respect to said field-establishing means, a plurality of pairs of electrodes within the duct for conveying currents of different magnitudes under the influence of the electromotive force, said pairs being disposed on separate nonparallel axes transverse of the duct, an output circuit, and means cyclically coupling said currents to said output circuit for forming an alternating current output.

2. In a magnetohydrodynamic generator for generating an electromotive force, a duct, means to establish transversely of said duct a magnetic field fixed in position with respect to said field-establishing means, a plurality of pairs of radial and oppositely disposed electrodes within the duct for conducting currents of different magnitude under the influence of the electromotive force, said pairs being disposed on separate nonparallel axes transverse of the duct, an output circuit, and means cyclically coupling said currents to said output circuit in a predetermined manner for providing an alternating current output.

3. In a magnetohydrodynamic generator for generating within a duct an electromotive force the magnitude of which varies substantially sinusoidally about the axis of said duct, means to establish transversely of said duct a magnetic field fixed in position with respect to said field-establishing means, a plurality of pairs of electrodes within said duct for providing separate currents under the influence of said electromotive force, said pairs being disposed on separate nonparallel axes transverse of the duct, an output circuit, and means cyclically coupling said currents to said output circuit.

4. In a magnetohydrodynamic generator for generating within a duct an electromotive force the magnitude of which varies substantially sinusoidally in a plane transverse of said duct, means to establish transversely of said duct a magnetic field fixed in position with respect to said field-establishing means, a plurality of pairs of electrodes within said duct for providing separate currents under the influence of said electromotive force, said pairs being disposed on separate nonparallel axes transverse of the duct, an output circuit, and means cyclically coupling said currents to said output circuit.

5. In a magnetohydrodynamic generator for generating within a duct an electromotive force the magnitude of which varies substantially sinusoidally about the axis of said duct in a plane transverse of said duct, means to establish transversely of said duct a magnetic field fixed in position with respect to said field-establishing means, a plurality of pairs of electrodes within said duct for providing separate currents of different magnitude under the influence of said electromotive force, said pairs being disposed on separate nonparallel axes transverse of the duct, an output circuit, and means for sequentially coupling said currents to said output circuit.

6. In a magnetohydrodynamic generator for generating within a duct an electromotive force, the magnitude of which varies substantially sinusoidally about the axis of said duct in a plane transverse of said duct, means to establish transversely of said duct a magnetic field fixed in position with respect to said field-establishing means, a plurality of pairs of electrodes within said duct providing separate currents of different magnitude under the influence of said electromotive force, said pairs being disposed on separate nonparallel axes transverse of the duct, said electrodes being substantially equally spaced one from another in a plane transverse of said duct, an alternating current output circuit, and means including rotatable means interconnecting said electrodes and said output circuit sequentially coupling said currents to said output circuit in a predetermined manner for providing an alternating current output as said means is rotated.

7. In a magnetohydrodynamic generator having a duct for conveying a stream of electrically conductive gas and having means for establishing magnetic flux through the duct transverse of the direction of gas movement, said flux being stationary with respect to said flux-establishing means, a plurality of pairs of oppositely disposed electrodes within said duct, said pairs being disposed on separate nonparallel axes transverse of said duct, an output circuit, and means for sequentially coupling each said pair of electrodes to said output circuit.

8. In a magnetohydrodynamic generator having an annular duct for conveying a stream of electrically conductive gas and having means for establishing a substantially uniform magnetic field through the duct transverse of the direction of gas movement, said flux being stationary with respect to said flux-establishing means, a plurality of pairs of oppositely disposed electrodes within said duct, said pairs being disposed on separate nonparallel axes transverse of said duct, an output circuit, and means for sequentially coupling each said pair of electrodes to said output circuit.

9. The combination as defined in claim 8 wherein said last mentioned means sequentially couples selected pairs of electrodes simultaneously to said output circuit.

10. In combination with a magnetohydrodynamic generator having an annular duct for conveying a stream of electrically conductive gas and having means for establishing a substantially uniform magnetic field through the duct transverse of the direction of gas movement, a plurality of pairs of oppositely disposed electrodes within said duct, said electrodes being substantially equally spaced one from another and disposed in a plane transverse of the direction of gas movement, an output circuit, and means for sequentially coupling each said pair of electrodes to said output circuit.

11. In combination with a magnetohydrodynamic generator having a duct for conveying a stream of electrically conductive gas and having means for establishing magnetic flux through the duct transverse of the direction of gas movement, a plurality of pairs of oppositely disposed electrodes within said duct, an alternating current output circuit, a translating apparatus interconnecting said electrodes and said output circuit, said apparatus including circuit interrupting means comprising a distributor having a conductive segment coupled to one each of said electrodes, means including a plurality of brushes cooperating with said distributor for sequentially coupling each said pair of electrodes to said output circuit, and means for providing relative motion between said segments and said brushes.

12. In combination with a magnetohydrodynamic generator having a generally cylindrical duct for conveying a stream of electrically conductive gas and having means for establishing a substantially uniform magnetic field through the duct transverse of the direction of gas movement, a plurality of pairs of oppositely disposed electrodes within said duct and said magnetic field, an alternating current output circuit, a translating apparatus interconnecting said electrodes and said output circuit, said apparatus including circuit interrupting means comprising a distributor having a conducting segment coupled to one each of said electrodes, said segments having the same relation one with another as said electrodes have one with another, means including a plurality of brushes cooperating with said distributor for sequentially coupling each said pair of electrodes to said output circuit, and means for providing relative motion between said segments and said brushes.

13. In combination with a magnetohydrodynamic generator having a generally cylindrical duct for conveying a stream of electrically conductive gas and having means for establishing a substantially uniform magnetic field through the duct transverse of the direction of gas movement, a plurality of pairs of oppositely disposed electrodes within said duct and said magnetic field, an alternating current output circuit, a translating apparatus interconnecting said electrodes and said output circuit, said apparatus including circuit interrupting means comprising a rotary distributor having a plurality of conducting segments, means including a plurality of slip rings and brushes for coupling each segment to one each of said electrodes in the same relation one with another as that of said eleectrodes, and a plurality of brushes cooperating with said distributor for sequentially coupling each said pair of electrodes to said output circuit.

14. In combination with a magnetohydrodynamic generator having a generally conically shaped duct for conveying a stream of electrically conductive gas at substantially constant velocity and having means for establishing a substantially uniform magnetic field through the duct transverse of the direction of gas movement, a plurality of pairs of oppositely disposed electrodes within said duct and said magnetic field, a polyphase alternating current output circuit including a polyphase transformer having primary and secondary windings, and circuit interrupting means couupling said electrodes to said primary windings, said interrupting means comprising a distributor having a plurality of conducting segments, means coupling each segment to one each of said electrodes in the same relation one with another as that of said electrodes, means including a plurality of brushes cooperating with said distributor for sequentially coupling each said pair of electrodes to said primary windings, and means for providing relative motion between said segments and said brushes.

15. The combination as defined in claim 14 wherein said distributor is a rotary distributor, said means coupling said segments to said electrodes comprise slip rings and slip ring brushes, and the location of said brushes cooperating with said distributor is selected to determine the phase of the currents coupled to said primary windings.

16. The combination as defined in claim 14 wherein said distributor brushes are rotated around said distributor, and said means coupling said electrodes to said primary windings additionally includes a plurality of slip rings and slip ring brushes interconnecting said distributor brushes and said primary windings.

17. In combination with a magnetohydrodynamic generator having a generally conically shaped duct for conveying a stream of electrically conductive gas at substantially constant velocity and having means for establishing a substantially uniform magnetic field through the duct transverse of the direction of gas movement, a plurality of pairs of oppositely disposed electrodes within said duct and said magnetic field, a polyphase alternating current output circuit including a polyphase transformer having primary and secondary windings, and circuit interrupting means coupling said electrodes to said primary windings, said interrupting means comprising a rotary distributor having a plurality of conducting segments, means for providing a continuous electrical path between each segment and one each of said electrodes, the relationship of said segments one to another being the same as the relationship of said electrodes one to another, and a plurality of brushes cooperating with said distributor for sequentially coupling each said pair of electrodes to said primary windings.

18. In combination with a magnetohydrodynamic generator having a generally conically shaped duct for conveying a stream of electrically conductive gas at substantially constant velocity and having means for establishing a substantially uniform magnetic field through the duct transverse of the direction of gas movement, a plurality of pairs of oppositely disposed electrodes within said duct and said magnetic field, a polyphase alternating current output circuit including a polyphase transformer having primary and secondary windings, and circuit interrupting means coupling said electrodes to said primary windings, said interrupting means comprising a cylindrical distributor having a plurality of conducting segments, means for providing a continuous electrical path between each segment and one each of said electrodes, the relationship of said segments one to another being the same as the relationship of said electrodes one to another, means including rotary driving means for providing relative motion between said segments and said brushes, and means including a pair of oppositely disposed distributor brushes cooperating with said distributor and connected to each primary winding for sequentially coupling each said pair of distributor brushes to said primary windings during relative motion between said segments and said brushes.

19. The combination as defined in claim 18 including a polyphase transformer for each phase of the output circuit, each said transformer having a plurality of primary windings and a secondary winding, and adjacent pairs of brushes are connected to the primary windings of each said transformer.

20. The combination as defined in claim 18 wherein said electrodes are substantially equally spaced one from another around the periphery of said duct, said distributor is rotatably driven by said rotary driving means, said means coupling said segments to said electrodes comprise slip rings and slip ring brushes, and the location of said distributor brushes is selected to determine the phase of the currents coupled to said primary windings.

21. The combination as defined in claim 18 wherein said electrodes are substantially equally spaced one from another around the periphery of the duct, said means coupling said distributor brushes and said primary windings includes slip rings and slip ring brushes, and means to maintain said distributor brushes in selected spaced relationship one with another, said means being in driven connection with said rotary driving means.

22. In combination with a magnetohydrodynamic generator having a generally conically shaped duct for conveying a stream of electrically conductive gas at substantially constant velocity and having means for establishing a substantially uniform magnetic field through the duct transverse of the direction of gas movement, a plurality of pairs of oppositely disposed electrodes within said duct, and said magnetic field, a polyphase alternating current output circuit including a polyphase transformer having a ring primary winding and secondary windings, said primary winding having a plurality of taps, and circuit interrupting means coupling said electrodes to said primary windings, said interrupting means comprising a rotary distributor having a plurality of conducting segments, means for providing a continuous electrical path between each segment and one each of said electrodes, the relationship of said segments one to another being the same as the relationship of said electrodes one to another, and a plurality of pairs of brushes cooperating with said distributor and connected to said primary winding taps for sequentially coupling each said pair of electrodes to said primary winding to provide a wave of current travelling around said primary winding as said distributor is rotated.

23. The combination as defined in claim 22 wherein the number of taps and brushes respectively are equal to not more than one half the number of segments.

24. The combination as defined in claim 22 wherein adjacent brushes are connected to adjacent taps.

25. In combination with a magnetohydrodynamic generator having a cylindrical duct for conveying a stream of electrically conductive gas and having means for establishing a substantially uniform magnetic field through the duct transverse of the direction of gas movement, a plurality of pairs of oppositely disposed electrodes within said duct, said electrodes being substantially equally spaced one from another and disposed substantially in a plane transverse of the direction of gas movement, one of the electrodes of each said pair being thermionic and adjacent another thermionic electrode, an output circuit, and means for sequentially coupling each said pair of electrodes to said output circuit.

26. In combination with a magnetohydrodynamic generator having a cylindrical duct for conveying a stream of electrically conductive gas and having means for establishing a substantially uniform magnetic field through the duct transverse of the direction of gas movement, a plurality of pairs of oppositely disposed electrodes within said duct, said electrodes being substantially equally spaced one from another and disposed substantially in a plane transverse of the direction of gas movement, one of the electrodes of each said pair being thermionic and adjacent another thermionic electrode, an output circuit, and means, including slip rings and a rotary distributor for sequentially coupling each said pair of electrodes to said output circuit.

27. In a magnetohydrodynamic generator having a duct for conveying a stream of electrically conductive gas the combination comprising means for establishing magnetic flux through said duct transverse of the direction of gas movement, said flux being constant in direction and sense with respect to said flux-establishing means, and a plurality of pairs of oppositely disposed electrodes within said duct, said pairs being disposed each on a separate axis transverse to said duct, said axes being nonparallel, at least three pairs of said electrodes being disposed on separate axes angularly displaced to the direction of said magnetic flux.

28. The combination as defined in claim 27 wherein said electrodes are substantially equally spaced one from another.

29. The combination as defined in claim 28 wherein said electrodes substantially lie in a plane transverse of the direction of gas movement.

30. In a magnetohydrodynamic generator the combination comprising a substantially circular duct for conveying a stream of electrically conductive gas, means for establishing magnetic flux through the duct transverse of the direction of gas movement, said flux being fixed in position and sense with respect to said flux-establishing means, and a plurality of pairs of oppositely disposed electrodes within said duct and said magnetic flux, said pairs being disposed each on a separate axis, said axes being nonparallel, said electrodes being substantially equally spaced one from another and lying in a plane transverse of the direction of gas movement.

31. In combination with a magnetohydrodynamic generator having a duct for conveying a stream of electrically conductive gas and having means for establishing magnetic flux through the duct transverse of the direction of gas movement, a plurality of pairs of oppositely disposed electrodes within said duct, said pairs being disposed each on a separate axis transverse to said duct, said axes being nonparallel, and means for providing rotary motion between said magnetic flux and said electrodes.

32. In combination with a magnetohydrodynamic generator having a duct for conveying a stream of electrically conductive gas and having means for establishing magnetic flux through the duct transverse of the direction of gas movement, a plurality of pairs of oppositely disposed electrodes within said duct, said pairs being disposed each on a separate axis transverse to said duct, said axes being nonparallel, an output circuit, means for coupling each said pair of electrodes to said output circuit, and means for providing rotary motion between said magnetic flux and said electrodes whereby a sinusoidal electromotive force is induced between each said pair of electrodes.

33. In combination with a magnetohydrodynamic generator having an annular duct for conveying a stream of electrically conductive gas and having means for establishing a substantially uniform magnetic field through the duct transverse of the direction of gas movement, a plurality of pairs of oppositely disposed electrodes within said duct, said electrodes being substantially equally spaced one from another and disposed in a plane transverse of the direction of gas movement, an output circuit, means for coupling each said pair of electrodes to said output circuit, and means providing rotary motion between said magnetic field and said electrodes whereby a sinusoidal electromotive force is induced between each said pair of electrodes.

34. The combination as defined in claim 33, wherein said means for establishing said uniform magnetic field is in close proximity to said duct and is rotated about said electrodes.

35. The combination as defined in claim 33, wherein said means for establishing said uniform magnetic field is in close proximity to said duct and said electrodes are rotated within said magnetic field.

36. In a magnetohydrodynamic generator the combination comprising an annular duct for conveying a stream of electrically conductive gas, means including a coil having oppositely disposed first and second portions positioned outside of said duct in substantially close proximity thereto with said duct disposed between said coils thereby to produce a magnetic field in said duct in a transverse direction, means for rotating said coil about said duct to produce a rotating magnetic field through said conductive gas, a plurality of pairs of oppositely disposed electrodes within said duct, said electrodes being substantially equally spaced one from another and disposed in a plane transverse of the direction of gas movement, an output circuit, and means for coupling each pair of said electrodes to said output circuit.

37. In a magnetohydrodynamic generator the combination comprising an annular duct at least a portion of which is rotatable for conveying a stream of electrically conductive gas, means for rotating said duct, means for establishing a substantially uniform magnetic field through said duct transverse of the direction of gas movement, a plurality of pairs of oppositely disposed electrodes within said duct, said electrodes being insulated from and carried by said rotatable portion of said duct, said electrodes being substantially equally spaced one from another and disposed in a plane transverse of the direction of gas movement, an output circuit, and means for coupling each said pair of electrodes to said output circuit.

38. A magnetohydrodynamic generator comprising a source of conducting fluid, a duct connected to said source, a plurality of pairs of electrodes in said duct disposed on nonparallel axes transverse of said duct, means to establish a magnetic field transversely of said duct fixed in position and sense with respect to said field-establishing means, and means to sequentially draw from said electrodes a time-variant-voltage.

39. A magnetohydrodynamic generator comprising a source of conductive fluid, a duct having a lengthwise axis, said duct being connected to said source, at least three pairs of electrodes disposed in said duct on nonparallel axes transverse of said lengthwise axis, means to generate a magnetic field transverse of said lengthwise axis and fixed in position and sense with respect to said field generating means, and means to connect a load to said pairs of electrodes in cyclical succession.

40. A magnetohydrodynamic generator comprising a source of conductive fluid, a duct having a lengthwise axis, said duct being connected to said source, at least three pairs of electrodes disposed in said duct on nonparallel axes transverse of said lengthwise axis, means to generate a magnetic field transverse of said lengthwise axis fixed in position and sense with respect to said field generating means, and means to alter cyclically the relative orientation of said field and axes.

References Cited by the Examiner

UNITED STATES PATENTS

| 1,530,468 | 3/25 | Elliott | 310—4 |
| 1,713,211 | 5/29 | Barton | 307—82 |
| 1,791,861 | 2/31 | Calverley et al. | 321—49 |
| 2,166,155 | 7/39 | Hutchinson | 321—49 |
| 2,722,122 | 11/55 | Soffel | 310—4 |

FOREIGN PATENTS 1,161,079  3/58  France.

OTHER REFERENCES

Magnetohydrodynamic Generators . . . Power From High-Temperature Gas, by Stewart Way, published in Westinghouse Engineer, July 1960, pages 105–107.

LLOYD McCOLLUM, *Primary Examiner.*

SAMUEL BERNSTEIN, *Examiner.*

UNITED STATES PATENT OFFICE
CERTIFICATE OF CORRECTION

Patent No. 3,210,642 October 5, 19

Richard J. Rosa

It is hereby certified that error appears in the above numbered patent requiring correction and that the said Letters Patent should read as corrected below.

Column 4, line 18, for "dust" read -- duct --; column 5, line 51, for "oxygen," read -- oxygen. --; column 9, line 13, for "unlimited" read -- limited --; line 23, for "pump" read -- jump --; column 12, line 10, for "suround" read -- surroun --; line 61, for "electrode" read -- electrodes --; column 13 line 9, for "radius" read -- radians --; column 18, line 26, for "couupling" read -- coupling --; column 20, line 22, for "ol" read -- of --.

Signed and sealed this 20th day of September 1966.

(SEAL)
Attest:

ERNEST W. SWIDER
Attesting Officer

EDWARD J. BRENNER
Commissioner of Patents